United States Patent

[11] 3,567,860

[72] Inventors Bernard M. Oliver
Los Altos Hills;
Richard E. Monnier, Sunnyvale; Gregory Justice, Mountain View, Calif.
[21] Appl. No. 711,414
[22] Filed Mar. 7, 1968
[45] Patented Mar. 2, 1971
[73] Assignee Hewlett-Packard Company
Palo Alto, Calif.

[54] TELEVISION SYNCHRONIZING SYSTEM
14 Claims, 3 Drawing Figs.

[52] U.S. Cl. .......... 178/69.5
[51] Int. Cl. .......... H04n 5/10
[50] Field of Search .......... 178/7.3, 7.5, 69.5 (TV)

[56] References Cited
UNITED STATES PATENTS
3,336,440 8/1967 Blake et al. .......... 178/69.5(TV)

*Primary Examiner*—Richard Murray
*Attorney*—Roland I. Griffin

ABSTRACT: A sync stripper removes the picture signal from the composite video input signal leaving a composite synchronizing signal that includes horizontal and vertical sync pulses. An oscillator produces a periodic timing signal having a repetition rate equal to twice that of the horizontal sync pulses. This timing signal is supplied to a binary scaler to produce a synchronizing signal for periodically triggering a horizontal deflection circuit at a repetition rate equal to that of the horizontal sync pulses. A feedback circuit, responsive to this synchronizing signal and to the composite synchronizing signal, phase locks the oscillator to the composite synchronizing signal and maintains the repetition rate of the oscillator at twice that of the horizontal sync pulses. The timing signal is also supplied to a gate that is periodically enabled in response to the vertical sync pulses to provide a synchronizing signal for periodically triggering a vertical deflection circuit at a repetition rate equal to that of the vertical sync pulses.

INVENTORS
BERNARD M. OLIVER
RICHARD E. MONNIER
GREGORY JUSTICE
BY Roland I. Griffin
ATTORNEY

PATENTED MAR 2 1971

3,567,860

INVENTORS
BERNARD M. OLIVER
RICHARD E. MONNIER
GREGORY JUSTICE

BY Roland I. Griffin

ATTORNEY

TELEVISION SYNCHRONIZING SYSTEM

BACKGROUND AND SUMMARY OF THE INVENTION

This invention relates to television synchronizing systems wherein the horizontal scanning lines of successive fields are interlaced. Such systems are described in Charles W. Harrison's U.S. Pat. No. 2,668,872 issued on Feb. 9, 1954, and in Joel Grayson Jones' U.S. Pat. No. 3,069,499 issued on Dec. 18, 1962. In each of the systems of these patents the horizontal deflection circuit is triggered by the horizontal sync pulses of a composite synchronizing signal. The vertical deflection circuit is triggered by amplitude selected signals obtained from the summation of a timing signal derived from the composite synchronizing signal and of the vertical sync pulses or a signal derived from them. Since the horizontal and vertical deflection circuits are triggered by the composite synchronizing signal or signals derived therefrom, an immediate loss of synchronization can be caused by noise-interference with the composite synchronizing signal or by the intermittent absence of some of the sync pulses of the composite synchronizing signal.

Accordingly, it is the principal object of this invention to provide an improved television synchronizing system particularly in the presence of noise.

Another object of this invention is to provide a television synchronizing system for achieving more even and reliable interlace.

It is still another object of this invention to provide a television synchronizing system in which the need for horizontal and vertical adjustments is eliminated.

These objects are accomplished according to the illustrated embodiment of this invention by employing an oscillator for producing a periodic timing signal having a repetition rate equal to twice that of the horizontal sync pulses of the composite synchronizing signal and by employing feedback to phase lock the oscillator to the composite synchronizing signal. A binary scaler is supplied with the timing signal to produce a stable synchronizing signal for periodically triggering the horizontal deflection circuit in phase with and at a repetition rate equal to that of the horizontal sync pulses. A gate is also supplied with the timing signal and is periodically enabled in response to the vertical sync pulses of the composite synchronizing signal to provide a stable synchronizing signal for periodically triggering the vertical deflection circuit at a repetition rate equal to that of the vertical sync pulses.

Other and incidental objects of this invention will be apparent from a reading of this specification and an inspection of the accompanying drawing in which.

DESCRIPTION OF THE PREFERRED EMBODIMENT

Figure 1:
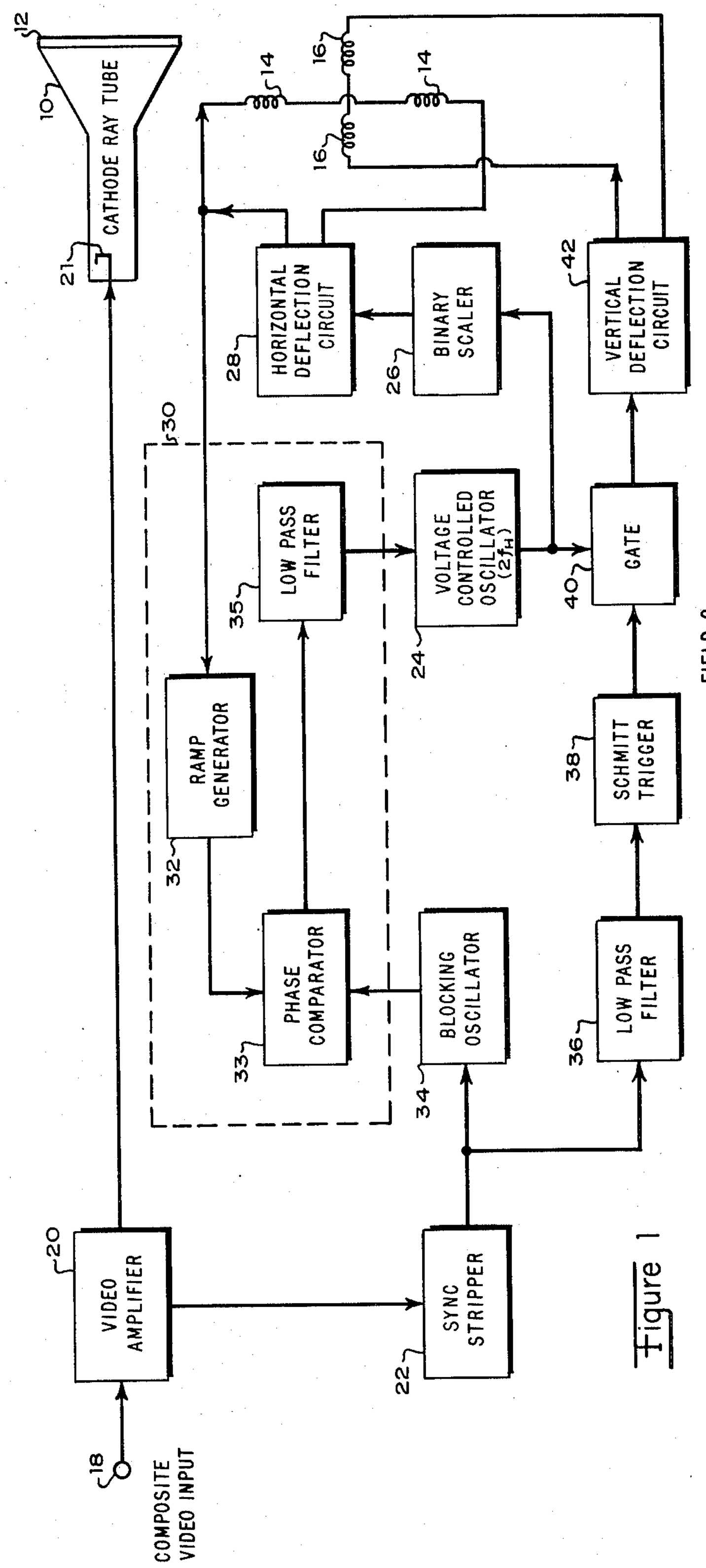
FIG. 1 is a schematic block diagram of a television synchronizing system according to the preferred embodiment of this invention.
Figure 2:
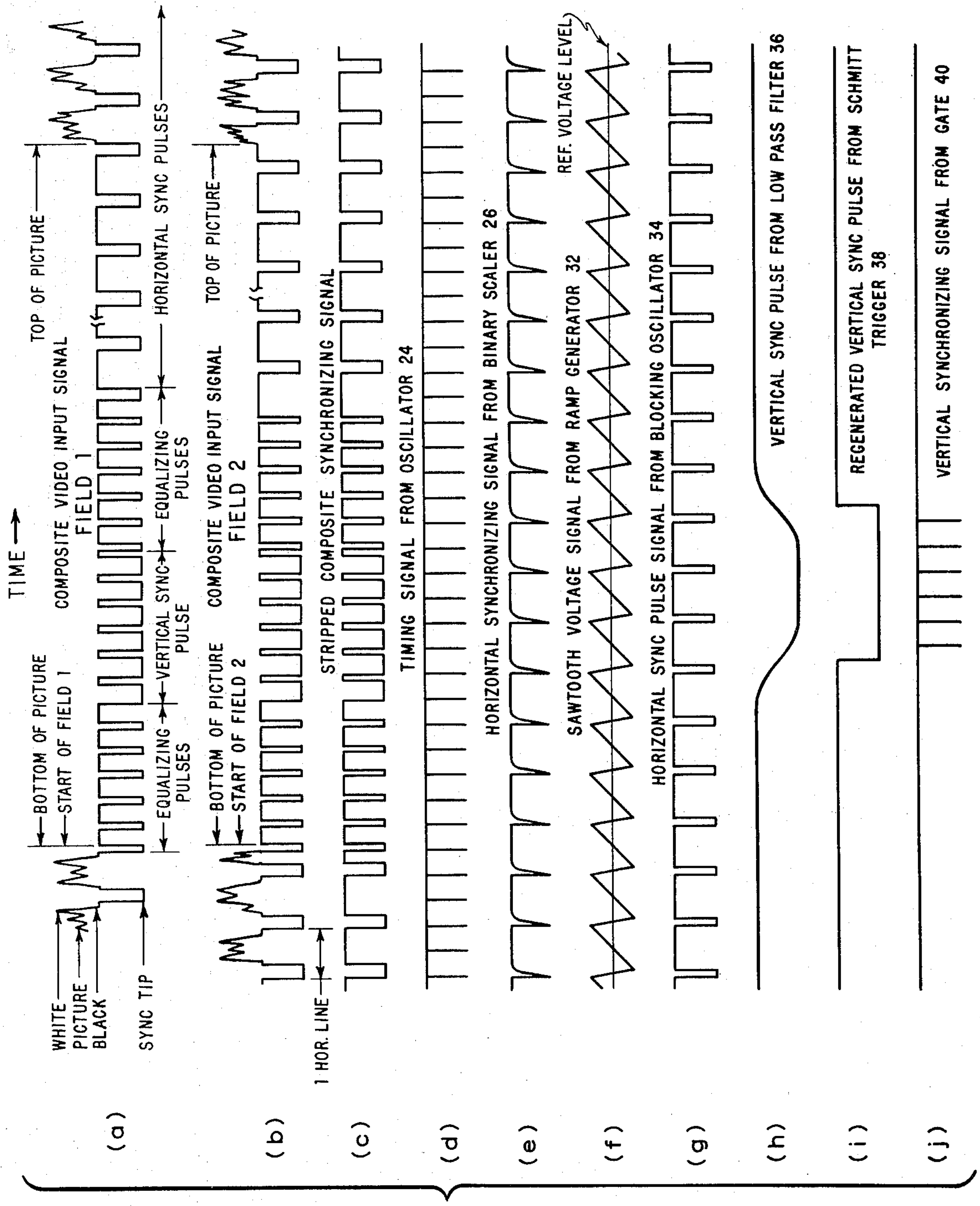
FIG. 2 is a diagram representing the waveforms at various points in the system of FIG. 1.

Referring now to FIG. 1, there is shown a cathode ray tube 10 having a display screen 12 and horizontal and vertical magnetic deflection coils represented schematically at 14 and 16 respectively. A composite video signal comprising both picture and synchronizing signals is supplied to the input 18 of a video amplifier 20. Vertical synchronizing intervals of field one and field two of a typical composite video signal are shown in FIGS. 2*a* and 2*b*. The video amplifier 20 is connected for supplying the amplified composite video signal to a control electrode 21 of cathode ray tube 10 to control the intensity of the electron beam as it scans across display screen 12. Video amplifier 20 is also connected for supplying the composite video signal to a sync stripper 22. Sync stripper 22 removes the picture signal from the composite video signal thereby leaving a composite synchronizing signal such as that illustrated for field two in FIG. 2*c*. This composite synchronizing signal is supplied to the television synchronizing system.

Figure 3:
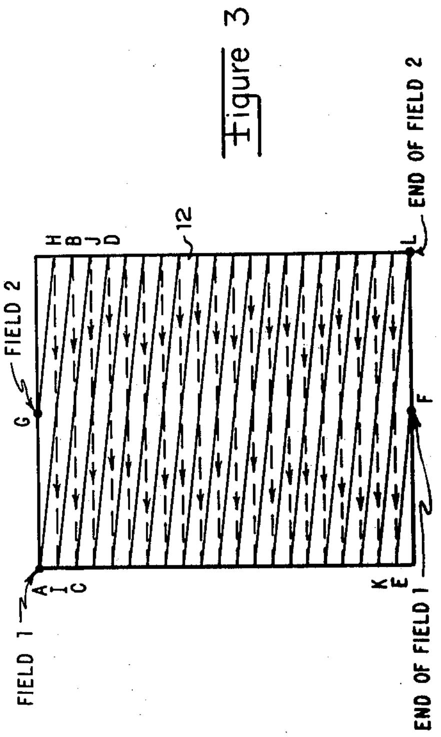
FIG. 3 is a diagram illustrating the interlaced path of the electron beam as it scans across the display screen of the cathode ray tube of FIG. 1.

The television synchronizing system includes a voltage controlled oscillator 24 for continuously producing a periodic timing signal having a repetition rate equal to an integral multiple, preferably twice that of the horizontal sync pulses of the composite synchronizing signal. Such a timing signal is shown in FIG. 2*d*. Oscillator 24 is connected for supplying the timing signal to the input of a binary scaler 26. The repetition rate of the timing signal is divided in half by binary scaler 26 to produce a pulse signal having a repetition rate equal to that of the horizontal sync pulses. A horizontal synchronizing signal is produced from the leading edges of this pulse signal by conventional differentiating and clipping circuitry included, for example, as an output stage of binary scaler 26. This horizontal synchronizing signal is shown for field two in FIG. 2*e*. Binary scaler 26 is connected for supplying the horizontal deflection circuit 28 to periodically trigger horizontal deflection circuit 28 at a repetition rate equal to that of the horizontal sync pulses. Each time horizontal deflection circuit 28 is triggered it supplies horizontal deflection coils 14 with a sawtooth current waveform having a negative-going ramp with a relatively steep slope and a longer positive-going ramp with a relatively gentle slope. During the negative-going ramp, the electron beam of cathode ray tube 10 is deflected from the end of a horizontal scan on the right side of display screen 12 to the beginning of the next horizontal scan on the left side of the display screen, as indicated by the dashed lines in FIG. 3. This retrace of the horizontal scan occurs in phase with the horizontal sync pulses of the composite synchronizing signal so long as the timing signal from oscillator 24 is phase-locked to the composite synchronizing signal and stabilized at a repetition rate equal to twice that of the horizontal sync pulses. During the positive-going ramp, the electron beam of cathode ray tube 10 scans from left to right across display screen 12, as indicated by the solid lines in FIG. 3. Although every block shown in FIG. 1 may comprise a conventional circuit of the type well known to those skilled in the art to which this invention appertains, very substantial improvement in the linearity of the horizontal scan may be achieved by employing a horizontal deflection circuit of the type disclosed in U.S. Pat. No. 3,434,002 entitled HORIZONTAL DEFLECTION CIRCUIT WITH MONITOR WINDING INDUCTIVELY COUPLED TO YOKE and issued on Mar. 18, 1969, to Bernard M. Oliver.

Oscillator 24 is phase locked to the composite synchronizing signal and is stabilized at a repetition rate equal to twice that of the horizontal sync pulses by an automatic phase control feedback circuit 30. This feedback circuit may include a ramp generator 32 connected between the output of horizontal deflection circuit 28 and one input of a phase comparator 33. Ramp generator 32 is periodically triggered by the voltage signal developed across horizontal deflection coils 14 during the steep negative-going ramp of each sawtooth current waveform form horizontal deflection circuit 28. Each time ramp generator 32 is triggered it produces a sawtooth voltage waveform having a linear and relatively steep negative-going ramp in phase with the retrace of the horizontal scan and symmetrically disposed about a reference voltage level such as ground. This sawtooth voltage signal is shown for field two in FIG. 2*f*. The composite synchronizing signal from sync stripper 22 is supplied to the input of a blocking oscillator 34 that is connected to another input of phase comparator 33. Blocking oscillator 34 is triggered by the horizontal sync pulses and also those equalizing pulses and serrated vertical pulse sections that occur at the repetition rate of the horizontal sync pulses to generate a horizontal sync pulse signal such as that shown for field two in FIG. 2*g*. Each pulse of this horizontal sync pulse signal is symmetrically disposed about the center of a corresponding negative-going ramp of the sawtooth voltage signal of FIG. 2*f* when the retrace of the horizontal scan is in phase with the horizontal sync pulses. Phase comparator 33 may comprise a sampling gate that is periodically enabled by the horizontal sync pulse signal from blocking oscillator 34 to pass portions of the sawtooth voltage signal from ramp generator 32. Thus, each time the sampling gate is enabled when the retrace of the horizontal scan is in phase with the horizontal sync pulses, an output voltage signal comprising portions of equal area and opposite polarity with respect to the reference voltage level is produced by phase comparator 33. However, each time the sampling gate is enabled when the retrace of the horizontal scan is slightly out of phase with the horizontal sync pulses, an output voltage signal comprising portions of unequal area and opposite polarity with respect to the reference voltage level is produced by phase comparator 33. In this case, the polarity of the portion of largest area depends upon whether the retrace of the horizontal scan leads or lags the horizontal sync pulses in phase. A low pass filter 35 is connected for receiving the output voltage signals from phase comparator 33. This low pass filter produces a zero, positive, or negative control voltage with respect to the reference voltage level from these output voltage signals depending upon the difference in area between the opposite polarity portions of the output voltage signals. Filter 35 is connected for supplying this control voltage to a control input of voltage controlled oscillator 24 to phase lock the oscillator to the composite synchronizing signal and to maintain the repetition rate of the timing signal equal to twice that of the horizontal sync pulses. This keeps the horizontal synchronizing signal from binary 26 in phase with the horizontal sync pulses of the composite synchronizing signal. Filter 35 also provides automatic phase control feedback circuit 30 with noise immunity through bandwidth reduction.

The composite synchronizing signal from sync stripper 22 is also supplied to the input of a low pass filter 36. Low pass filter 36 passes the serrated vertical sync pulses and filters out the equalizing pulses and horizontal sync pulses, as indicated for field two in FIG. 2*h*. A Schmitt trigger 38 connected to the output of low pass filter 36 regenerates the vertical sync pulses passed by the filter. This produces rectangular vertical sync pulses such as the one shown for field two in FIG. 2*i*. Schmitt trigger 38 is connected for supplying these regenerated vertical sync pulses to the control input of a gate 40. Oscillator 24 is connected for supplying the stabilized timing signal shown in FIG. 2*d* to the signal input of this gate. Gate 40 is periodically enabled by the regenerated vertical sync pulses so that it provides a vertical synchronizing signal comprising gated portions of the stabilized timing signal such as the gated portion shown for field two in FIG. 2*j*. Gate 40 is connected for supplying the gated portions of the stabilized timing signal to the input of a vertical deflection circuit 42. Only the first pulse of each gated portion is effective to trigger the vertical deflection circuit. Thus, vertical deflection circuit 42 is periodically triggered at a repetition rate equal to that of the vertical sync pulses of the composite synchronizing signal. Each time vertical deflection circuit 42 is triggered, it supplies vertical deflection coils 16 with a sawtooth current waveform for deflecting the electron beam of cathode ray tube 10 from the end of a vertical scan at the bottom of display screen 12 to the beginning of the next vertical scan at the top of the display screen. During field one, this retrace of the vertical scan deflects the electron beam of cathode ray tube 10 from the bottom right corner of display screen 12 to the top left corner of the display screen. The sawtooth current waveform supplied to deflection coils 16 then deflects the electron beam of cathode ray tube 10 along every other horizontal scan line from top to bottom across the display screen, as indicated by the letters A through F in FIG. 3. During field two, the retrace of the vertical scan deflects the electron beam of cathode ray tube 10 from the bottom center of display screen 12 to the top center of the display screen. The sawtooth current waveform supplied to deflection coils 16 then deflects the electron beam of cathode ray tube 10 along every other horizontal scan line from top to bottom across the display screen, as indicated by the letters G through L in FIG. 3. Even and reliable interlacing requires that the retrace of the vertical scan during field two be started precisely one-half of a horizontal scan line after the last complete horizontal scan line of field one. For example, in the case of the 525-line, 60-fields-per-second U.S. system, the retrace of the vertical scan during field two must be started precisely after 262½lines of field one. This is achieved nearly perfectly in the above-described synchronizing system since a single oscillator 24 stabilized at twice the repetition rate of the horizontal sync pulses and phase locked to the composite synchronizing signal is employed to drive both the horizontal and vertical deflection circuits 28 and 42.

We claim:

1. A television synchronizing system for receiving a composite synchronizing signal that includes horizontal sync pulses having a repetition rate $f_H$ and vertical sync pulses having a repetition rate $f_V$, said system comprising:
- an oscillator for producing a periodic timing signal having a repetition rate $nf_H$ where $n$ is an integer;
- an feedback circuit connected to said oscillator for locking the oscillator in phase with the horizontal sync pulses of the composite synchronizing signal;
- a horizontal deflection circuit;
- first circuit means connected between said oscillator and said horizontal deflection circuit for dividing the repetition rate of the timing signal by $n$ to supply the horizontal deflection circuit with a horizontal synchronizing signal having a repetition rate $f_H$;
- a vertical deflection circuit; and
- second circuit means connected between said oscillator and said vertical deflection circuit and responsive to the vertical sync pulses of the composite synchronizing signal and to portions of the timing signal for supplying the vertical deflection circuit with a vertical synchronizing signal having a repetition rate $f_V$.

2. A television synchronizing system as in claim 1 wherein said second circuit means is responsive to the vertical sync pulses of the composite synchronizing signal for gating portions of the timing signal to supply the vertical deflection circuit with the vertical synchronizing signal.

3. A television synchronizing system as in claim 2 wherein:
- said timing signal has a repetition rate equal to $2f_H$;
- said first circuit means divides the repetition rate of the timing signal in half to provide the horizontal synchronizing signal; and
- said second circuit means is responsive to gating signals derived from the vertical sync pulses of the composite synchronizing signal for passing only portions of the timing signal that coincide in time with the gating signals to supply the vertical deflection circuit with the vertical synchronizing signal.

4. A television synchronizing system as in claim 3 wherein said feedback circuit comprises:
- first feedback means responsive to the horizontal synchronizing signal and to the composite synchronizing signal for producing an error signal related to the phase difference between these signals; and
- second feedback means connected to said first feedback means and responsive to the error signal for locking said oscillator in phase with the horizontal sync pulses of the composite synchronizing signal and for stabilizing the repetition rate of the timing signal at $2f_H$.

5. A television synchronizing system as in claim 4 wherein said second circuit means comprises:
- separation means for deriving a gating pulse comprising one of the gating signals from each vertical sync pulse of the composite synchronizing signal; and
- a gate having an input connected to said oscillator for receiving the timing signal therefrom, having another input connected to said separation means for receiving the gating pulses therefrom, and having an output connected to said vertical deflection circuit for supplying the vertical synchronizing signal thereto, said gate being periodically enabled by the gating pulses for passing said portions of the timing signal to provide the vertical synchronizing signal.

6. A television synchronizing system as in claim 5 wherein said separation means comprises:

third circuit means for providing a vertical sync pulse signal in response to each vertical sync pulse and for filtering out the remaining pulses of the composite synchronizing signal; and a wave shaping circuit connected to said third circuit means, said wave shaping circuit being operative for regenerating the vertical sync pulse signals from said third circuit means to provide the gating pulses and being connected to said other input of said gate for supplying the gating pulses thereto.

7. A television synchronizing system as in claim 5 wherein said first circuit means comprises a scale of two divider connected to said oscillator for halving the repetition rate of the timing signal to provide the horizontal synchronizing signal, said scale of two divider being connected to said horizontal deflection circuit for supplying the horizontal synchronizing signal thereto.

8. A television synchronizing system as in claim 5 wherein said first feedback means comprises:

a ramp generator responsive to the horizontal synchronizing signal for producing a ramp signal having a repetition rate equal to that of the horizontal synchronizing signal; and a phase comparator connected to said ramp generator and responsive to the ramp signal and to the composite synchronizing signal for producing the error signal.

9. A television synchronizing system as in claim 8 wherein said second feedback means comprises a low pass filter connected between said phase comparator and said oscillator, said low pass filter being responsive to the error signal for supplying a stabilizing control signal to said oscillator.

10. A television synchronizing system as in claim 9 including a wave shaping circuit connected to said phase comparator, said wave shaping circuit being responsive to the composite synchronizing signal signal for supplying said phase comparator with a signal having a repetition rate equal to that of the horizontal sync pulses of the composite synchronizing signal.

11. A television synchronizing system as in claim 1 wherein said feedback circuit is responsive to the horizontal synchronizing signal and to the composite synchronizing signal for producing an error signal related to the phase difference between these signals and is responsive to the error signal for locking said oscillator in phase with the horizontal sync pulses of the composite synchronizing signal.

12. A television synchronizing system as in claim 11 wherein said feedback circuit comprises:

a ramp generator responsive to the horizontal synchronizing signal for producing a ramp signal having a repetition rate equal to that of the horizontal synchronizing signal;

a phase comparator connected to said ramp generator and responsive to the ramp signal and to the composite synchronizing signal for producing the error signal; and means connected between said phase comparator and said oscillator and responsive to the error signal for supplying a stabilizing control signal to said oscillator.

13. A television synchronizing system as in claim 12 wherein:

said last-mentioned means comprises a low pass filter; and said system includes a wave shaping circuit connected to said phase comparator, said wave shaping circuit being responsive to the composite synchronizing signal for supplying said phase comparator with a signal having a repetition rate equal to that of the horizontal sync pulses of the composite synchronizing signal.

14. A television synchronizing system for receiving a composite synchronizing signal that includes horizontal sync pulses having a repetition rate $f_H$ and vertical sync pulses having a repetition rate $f_V$, said system comprising:

an oscillator for producing a periodic timing signal having a repetition rate $nf_H$ where $n$ is an integer;

a feedback circuit connected to said oscillator for locking the oscillator in phase with the horizontal sync pulses of the composite synchronizing signal;

a horizontal deflection circuit;

means connected between said oscillator and said horizontal deflection circuit for dividing the repetition rate of the timing signal by $n$ to supply the horizontal deflection circuit with a horizontal synchronizing signal having a repetition rate $f_H$;

a vertical deflection circuit; and a gate connected between said oscillator and said vertical deflection circuit and responsive to gating pulses derived from the vertical sync pulses of the composite synchronizing signal for passing only those portions of the timing signal that coincide in time with the gating pulses to supply the vertical deflection circuit with a vertical synchronizing signal having a repetition rate $f_V$.

UNITED STATES PATENT OFFICE
CERTIFICATE OF CORRECTION

Patent No. 3,567,860 Dated March 2, 1971

Inventor(s) Bernard M. Oliver, Richard E. Monnier & Gregory Ji

It is certified that error appears in the above-identified patent and that said Letters Patent are hereby corrected as shown below:

Column 2, line 18, after "the" insert -- horizontal synchronizing signal to the input of a --;

Column 4, line 19, "an" should read -- a --;

Column 5, line 38, "signal signal" should read -- signal --.

Signed and sealed this 29th day of June 1971.

(SEAL)
Attest:

EDWARD M.FLETCHER,JR.
Attesting Officer

WILLIAM E. SCHUYLER, JR.
Commissioner of Patents